No. 762,245. PATENTED JUNE 7, 1904.
L. M. McGEHEE.
ROD COUPLING.
APPLICATION FILED NOV. 18, 1903.
NO MODEL.
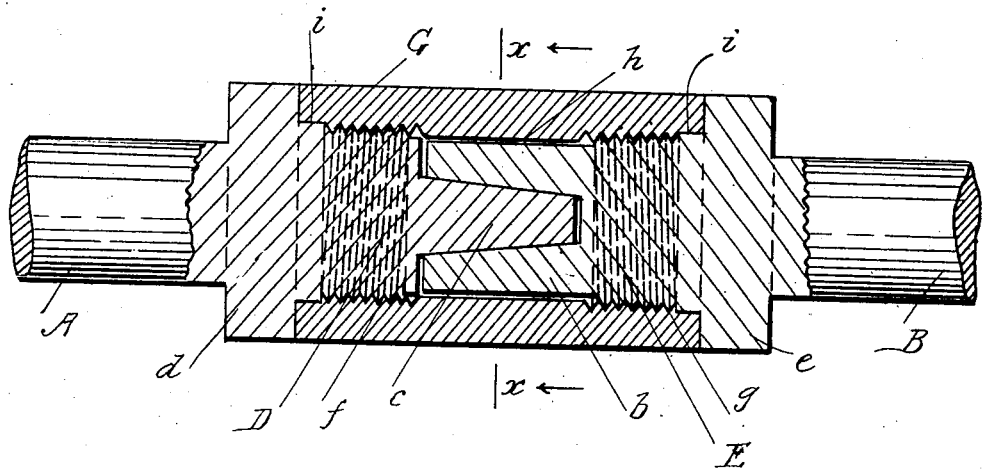
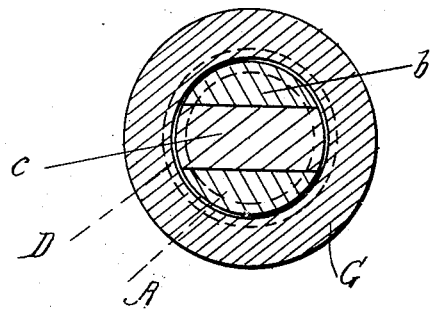
WITNESSES:
John C. O'Shea
Walter Allen
INVENTOR
Lucius M. McGehee.
BY
Herbert W. T. Jenner.
Attorney No. 762,245. Patented June 7, 1904.

UNITED STATES PATENT OFFICE.

LUCIUS M. McGEHEE, OF SAN ANTONIO, TEXAS, ASSIGNOR OF TWO-THIRDS TO JOHN L. CLEMENTS AND WILLIAM BROWN, OF SAN ANTONIO, TEXAS.

ROD-COUPLING.

SPECIFICATION forming part of Letters Patent No. 762,245, dated June 7, 1904.

Application filed November 18, 1903. Serial No. 181,634. (No model.)

*To all whom it may concern:*

Be it known that I, LUCIUS M. McGEHEE, a citizen of the United States, residing at San Antonio, in the county of Bexar and State of Texas, have invented certain new and useful Improvements in Rod-Couplings; and I do hereby declare the following to be a full, clear, and exact description of the invention, such as will enable others skilled in the art to which it appertains to make and use the same.

This invention relates to couplings for rods, shafts, and other similar parts; and it consists in the novel construction and combination of the parts hereinafter fully described and claimed.

In the drawings, Figure 1 is a longitudinal section through the sleeve of the coupling, showing the parts partially screwed together. Fig. 2 is a cross-section taken on the line $x\ x$ in Fig. 1.

A and B are two similar rods or shafts the end portions of which are arranged in alinement. The shaft A has preferably a wedge-shaped projection $c$ on its end, and the shaft B has a wedge-shaped socket $b$, with which the projection $c$ is adapted to engage, so that the two shafts are revolved together. Any other form of projection and socket provided with interlocking devices may be used for connecting the two shafts, provided the said interlocking devices can be slid longitudinally into engagement with each other. The shaft A has a screw-threaded portion D, and the shaft B has a screw-threaded portion E, the screw-threaded portion of one shaft being cut in the reverse direction from the screw-threaded portion of the other shaft, so that they are right and left. The shaft A has also a collar $d$, and the shaft B has a collar $e$.

G is the coupling-sleeve, which is provided with screw-threaded portions $f$ and $g$ at its ends, which engage with the screw-threaded portions of the two shafts. The middle portion $h$ of the sleeve has no screw-threads, and its extreme end portions $i$ are also without screw-threads and form guides. The screw-threaded portions of the two shafts are placed in the guides $i$, and the interlocking devices of the shafts then engage loosely with each other. The parts of the coupling are then screwed up either by revolving the sleeve or by revolving one of the rods. As the sleeve is revolved the two shafts are drawn together and their interlocking devices are placed into full engagement. When the coupling is fully screwed up, the two collars come against the ends of the sleeve because the screw-threaded portions of the shafts are of equal length.

This coupling connects two rods securely together and is very useful for many purposes. When used to connect two shafts, power can be transmitted through it from one shaft to the other, as the shafts are positively connected by the interlocking devices.

What I claim is—

In a coupling, the combination, with two rods or shafts having slidable interlocking devices at their adjacent ends, collars near said ends, and screw-threaded portions arranged between the said collars and interlocking devices and having their screw-threads cut in opposite directions, of a sleeve which has plain cylindrical guides for the said screw-threaded portions at its ends, a plain cylindrical portion at its middle part, and screw-threaded portions between the said plain portions and which engage with the aforesaid screw-threaded portions and draw the said collars against the ends of the sleeve.

In testimony whereof I affix my signature in presence of two witnesses.

LUCIUS M. McGEHEE.

Witnesses:
GEO. C. MATTHEWS,
A. G. SARGENT.